United States Patent
Chyn et al.

(10) Patent No.: US 12,217,536 B2
(45) Date of Patent: Feb. 4, 2025

(54) GRID-BASED ENROLLMENT FOR FACE AUTHENTICATION

(71) Applicant: Google LLC, Mountain View, CA (US)

(72) Inventors: Kevin Chyn, San Jose, CA (US); James Brooks Miller, Sunnyvale, CA (US); Tyler Reed Kugler, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 117 days.

(21) Appl. No.: 17/766,688

(22) PCT Filed: Dec. 5, 2019

(86) PCT No.: PCT/US2019/064662
§ 371 (c)(1),
(2) Date: Apr. 5, 2022

(87) PCT Pub. No.: WO2021/071532
PCT Pub. Date: Apr. 15, 2021

(65) Prior Publication Data
US 2024/0078846 A1    Mar. 7, 2024

Related U.S. Application Data

(60) Provisional application No. 62/913,650, filed on Oct. 10, 2019.

(51) Int. Cl.
*G06V 40/16* (2022.01)
*G06V 10/10* (2022.01)
(Continued)

(52) U.S. Cl.
CPC .......... *G06V 40/161* (2022.01); *G06V 10/143* (2022.01); *G06V 40/165* (2022.01);
(Continued)

(58) Field of Classification Search
None
See application file for complete search history.

(56) References Cited

U.S. PATENT DOCUMENTS

| 9,117,109 B2 | 8/2015 | Nechyba et al. |
| 9,998,659 B2 | 6/2018 | Bassi |

(Continued)

FOREIGN PATENT DOCUMENTS

| WO | 2015198478 | 12/2015 |
| WO | 2018226265 | 12/2018 |

(Continued)

OTHER PUBLICATIONS

"Central Cylindrical Projection", retrieved from https://en.wikipedia.org/w/index.php?title=Central_cylindrical_projection&oldid=919200175, Oct. 2, 2019, 2 pages.

(Continued)

Primary Examiner — Fan Zhang
(74) Attorney, Agent, or Firm — Colby Nipper PLLC

(57) ABSTRACT

This document describes techniques and systems that enable grid-based enrollment for face authentication. The techniques and systems include overlaying a three-dimensional (3D) tracking window over a preview image of the user's face displayed via a display device. The 3D tracking window includes a plurality of segments, which persist to correspond to an approximate direction that the user's face is facing. Based on the tracking, segments are highlighted to indicate the approximate direction that the user's face is facing, a camera captures enrollment images of the user's face facing that direction, and embeddings are generated based on the enrollment images and stored in a fixed grid of pose cells corresponding to various facial poses for use in face authen- (Continued)

tication. Responsive to generation and storage of the embeddings, an indication that the one or more segments are completed is provided.

20 Claims, 10 Drawing Sheets

(51) Int. Cl.
  *G06V 10/143* (2022.01)
  *G06V 40/50* (2022.01)
  *G06V 40/60* (2022.01)

(52) U.S. Cl.
  CPC ............ *G06V 40/166* (2022.01); *G06V 40/50* (2022.01); *G06V 40/67* (2022.01); *G06V 10/17* (2022.01)

(56) References Cited

U.S. PATENT DOCUMENTS

| | | | |
|---|---|---|---|
| 10,540,806 B2 | 1/2020 | Yang et al. | |
| 2003/0123713 A1* | 7/2003 | Geng | G06F 18/28 348/47 |
| 2009/0207266 A1 | 8/2009 | Yoda | |
| 2011/0090303 A1 | 4/2011 | Wu et al. | |
| 2014/0368606 A1 | 12/2014 | Bassi | |
| 2018/0189550 A1 | 7/2018 | McCombe et al. | |
| 2018/0240265 A1 | 8/2018 | Yang et al. | |

FOREIGN PATENT DOCUMENTS

| | | | |
|---|---|---|---|
| WO | WO-2018226265 A1 * | 12/2018 | ............ G06F 18/00 |
| WO | 2021071532 | 4/2021 | |

OTHER PUBLICATIONS

"International Search Report and Written Opinion", Application No. PCT/US2019/064662, Jul. 7, 2020, 15 pages.
"Mercator Projection", retrieved from https://en.wikipedia.org/w/index.php?title=Mercator_projection&oldid=955134599, Jun. 15, 2020, 15 pages.
"Stereographic Projection", retrieved from https://en.wikipedia.org/w/index.php?title=Stereographic_projection&oldid=954632592, May 28, 2020, 16 pages.
Schroff, et al., "FaceNet: A Unified Embedding for Face Recognition and Clustering", 2015 IEEE Conference on Computer Vision and Pattern Recognition (CVPR), Jul. 12, 2015, 10 pages.
Shih, et al., "Distortion-Free Wide-Angle Portraits on Camera Phones", ACM Transactions on Graphics, vol. 38, No. 4, Article 61; Retrieved from https://doi.org/10.1145/3306346.3322948, Jul. 2019, 12 pages.
Shih, et al., "Techniques for Wide-Angle Distortion Correction Using an Ellipsoidal Projection", Technical Disclosure Commons; Retrieved from https://www.tdcommons.org/dpubs_series/3299, Jun. 8, 2020, 9 pages.
Yang, et al., "Improved Object Detection in an Image by Correcting Regions with Distortion", Technical Disclosure Commons; Retrieved from https://www.tdcommons.org/dpubs_series/3090, Apr. 1, 2020, 8 pages.
"International Preliminary Report on Patentability", Application No. PCT/US2019/064662, Apr. 12, 2022, 9 pages.
"Foreign Office Action", EP Application No. 19828450.7, May 10, 2024, 7 pages.

* cited by examiner

600

| -20, 20 | -10, 20 | 0, 20 | 10, 20 | 20, 20 |
| --- | --- | --- | --- | --- |
| -20, 10 | -10, 10 | 0, 10 | 10, 10 | 20, 10 |
| -20, 0 | -10, 0 | 0, 0 | 10, 0 | 20, 0 |
| -20, -10 | -10, -10 | 0, -10 | 10, -10 | 20, -10 |
| -20, -20 | -10, -20 | 0, -20 | 10, -20 | 20, -20 |

650

| Pose | 2D | 3D |
| --- | --- | --- |
| (-10, 0) | [0, -1, 5, 3, 2] | [5, -5, -1, 9, 3] |
| (0, 0) | [0, -1, 5, 3, 2] | [5, -5, -1, 9, 3] |
| (20, -10) | [5, -3, 1, 4, 20] | [13, -8, 7, 0, 1] |

*Fig. 6*

GRID-BASED ENROLLMENT FOR FACE AUTHENTICATION

RELATED APPLICATION(S)

This application is a national stage entry of International Application No. PCT/US2019/064662, filed Dec. 5, 2019, which claims the benefit of U.S. Provisional Application No. 62/913,650, filed Oct. 10, 2019, the disclosures which are incorporated herein by reference in their entirety.

BACKGROUND

Three-dimensional (3D) face enrollment generally requires multiple views of a user's face. Challenges arise when an enrollment application communicates to the user how the user should move their head to achieve particular positions. Generally, this may include displaying text instructing the user to look left, right, up, or down. For any gaps in the data collection, the enrollment application may make more specific requests, such as "look at the two o'clock direction," which may be difficult for some users to imagine, potentially leading to user frustration and diminishing the user experience.

SUMMARY

This document describes a grid-based enrollment for face authentication and associated systems and techniques. These techniques include overlaying a three-dimensional (3D) tracking window over a preview image of the user's face. The 3D tracking window includes a plurality of segments, which persist to correspond to an approximate direction that the user's face is facing. Based on the tracking, segments are highlighted to indicate the approximate direction that the user's face is facing, a camera captures enrollment images of the user's face facing that direction, and embeddings are generated based on the enrollment images and stored in a fixed grid of pose cells corresponding to various facial poses for use in face authentication. Responsive to generation and storage of the embeddings, the highlighted segments are modified to indicate when one or more segments are completed. In this way, the user is guided to provide various facial poses to enable the system to capture enrollment images for use in face authentication. As such, a continued and guided human-machine interaction process for providing input data to a facial authentication system to generate corresponding verification data is provided.

According to an aspect, there is provided a method for a grid-based enrollment for face authentication by a user device, the method comprising: responsive to a user input, presenting a preview image, captured by a camera, via a display device, the presenting to initiate enrollment for face authentication; overlaying a two-dimensional (2D) object over the preview image, the 2D object having a region indicating an approximate orientation for a user to position their face relative to the camera; responsive to a determination that the user's face is positioned at the approximate orientation, removing the 2D object and presenting a three-dimensional (3D) tracking window as an overlay over the preview image, the 3D tracking window having a plurality of segments; tracking an approximate direction that the user's face is facing relative to the camera; based on the tracking: highlighting one or more segments of the plurality of segments of the 3D tracking window that correspond to the approximate direction that the user's face is facing; capturing one or more enrollment images of the user's face facing the approximate direction; generating one or more embeddings based on the one or more enrollment images; storing, in a secure storage unit, the one or more embeddings in a fixed grid of pose cells corresponding to various facial poses for use in face authentication; and responsive to generation and storage of the one or more embeddings, providing an indication that the one or more segments are complete.

According to another aspect, there is provided a method for a grid-based enrollment for face authentication by a user device, the method comprising: responsive to a user input, presenting a preview image, captured by a camera, via a display device, the presenting to initiate enrollment for face authentication; overlaying a two-dimensional (2D) object over the preview image, the 2D object comprising a center region indicating an approximate orientation for a user to position their face relative to the camera; responsive to a determination that the user's face is positioned within the center region, presenting a three-dimensional (3D) tracking window as an overlay over the preview image, the 3D tracking window having a plurality of segments, the plurality of segments persisting to correspond to an approximate direction that the user's face is facing relative to the camera system; tracking the approximate direction that the user's face is facing; determining one or more segments of the plurality of segments that correspond to the approximate direction that the user's face is facing; highlighting the one or more segments to provide visual feedback to the user; capturing one or more enrollment images corresponding to a pose of the user's face facing the approximate direction; generating one or more embeddings corresponding to the one or more enrollment images; and responsive to an indication that the one or more embeddings have been generated, providing an indication that the one or more segments are complete.

The method of either of the above aspects may further comprise the following features. Providing of the indication that the one or more segments are complete may comprise changing an opacity of the one or more segments to indicate progress. The method may further comprise, responsive to completing the enrollment: presenting a confirmation of completion of the enrollment; and enabling the one or more embeddings stored in the secure storage unit to be used to unlock the user device via the face authentication. The 3D tracking window may be shaped to direct the user to roll or rotate their head. The 3D tracking window may comprise a hemisphere. The preview image may be a live preview. The method may further comprise: responsive to presenting the 3D tracking window, initiating a timer; resetting the timer upon completion of a respective segment of the plurality of segments; and responsive to the timer expiring without one or more new segments of the plurality of segments being completed, providing an indication to direct the user to face a new direction corresponding to at least one of the one or more new segments. The method may further comprise: determining that a first segment, of the plurality of segments, near an edge of the 3D tracking window is incomplete and multiple segments adjacent to the first segment are complete; and indicating to the user that the first segment is complete without capturing an enrollment image of the user's face facing a direction corresponding to the first segment. The plurality of segments may each correspond to a pose of the user's head. The pose cells in the grid of pose cells may be characterized by pan angle and tilt angle. Highlighting of the one or more segments may comprise: fading in a first segment corresponding to the approximate direction that the user's face is facing relative to the camera;

and fading out the first segment when the approximate direction that the user's face is facing changes and no longer corresponds to the first segment; and a first animation speed corresponding to the fading in is greater than a second animation speed corresponding to the fading out. The indication that the one or more segments are complete may comprise haptic feedback. The indication that the one or more segments are complete may comprise audible feedback. The camera may comprise one or more color cameras and one or more near-infrared cameras. The one or more color cameras may be used to capture the preview image; and the capturing of the one or more enrollment images of the user's face may comprise capturing, using the one or more near-infrared cameras, one or more near-infrared images usable to generate the one or more embedding s.

According to a further aspect, there is provided a user device comprising: a camera system configured to capture images of a face of a user for face authentication; a display device configured to display a preview image including the user's face; and a processor and memory to implement an enrollment module configured to: responsive to initiation of an enrollment process, cause a two-dimensional (2D) object to be overlaid over the preview image, the 2D object comprising a center region indicating an approximate orientation for the user to position their face relative to the camera system; responsive to a determination that the user's face is positioned within the center region, present a three-dimensional (3D) tracking window as an overlay over the preview image, the 3D tracking window having a plurality of segments, the plurality of segments persisting to correspond to an approximate direction that the user's face is facing relative to the camera system; track the approximate direction that the user's face is facing; determine one or more segments of the plurality of segments that correspond to the approximate direction that the user's face is facing; highlight the one or more segments to provide visual feedback to the user; cause the camera system to capture one or more enrollment images corresponding to a pose of the user's face facing the approximate direction; generate one or more embeddings corresponding to the one or more enrollment images; and responsive to an indication that the one or more embeddings have been generated, provide an indication that the one or more segments are complete.

According to another aspect, there is provided a user device comprising: a camera system configured to capture images of a face of a user for face authentication; a display device configured to display a preview image including the user's face; and a processor and memory to implement an enrollment module configured to: responsive to initiation of an enrollment process, cause a two-dimensional (2D) object to be overlaid over the preview image, the 2D object having a region indicating an approximate orientation for the user to position their face relative to the camera system; responsive to a determination that the user's face is positioned at the approximate orientation, remove the 2D object and present a three-dimensional (3D) tracking window as an overlay over the preview image, the 3D tracking window having a plurality of segments; track an approximate direction that the user's face is facing relative to the camera; based on the tracking: highlight one or more segments of the plurality of segments of the 3D tracking window that correspond to the approximate direction that the user's face is facing; cause the camera system to capture one or more enrollment images of the user's face facing the approximate direction; generate one or more embeddings based on the one or more enrollment images; store, in a secure storage unit, the one or more embeddings in a fixed grid of pose cells corresponding to various facial poses for use in face authentication; and responsive to generation and storage of the one or more embeddings, provide an indication that the one or more segments are complete.

The user device of either aspect may further comprise the following features. The 3D tracking window may be shaped as a hemisphere and may be overlaid over the preview image such that the user's face in the preview image is displayed within the hemisphere. The enrollment module may be further configured to: responsive to presentation of the 3D tracking window, initiate a timer; reset the timer upon completion of a respective segment of the plurality of segments; and responsive to the timer expiring without one or more new segments of the plurality of segments being completed, provide an indication to direct the user to face a direction of at least one of the one or more new segments. The plurality of segments may each correspond to a pose of the user's head. The indication that the one or more segments are complete may comprise a change in opacity of the one or more segments.

According to a further aspect, there is provided a computer-readable storage media comprising instructions that, when executed, configure at least one processor of a user device to: display a preview image, captured by a camera system of the user device, via a display device during an enrollment process for face authentication; cause a two-dimensional (2D) object to be overlaid over the preview image, the 2D object comprising a center region indicating an approximate orientation for a user to position their face relative to the camera system; responsive to a determination that the user's face is positioned within the center region, present a three-dimensional (3D) tracking window as an overlay over the preview image, the 3D tracking window having a plurality of segments, the plurality of segments persisting to correspond to an approximate direction that the user's face is facing relative to the camera system; track the approximate direction that the user's face is facing; identify one or more segments of the plurality of segments that correspond to the approximate direction that the user's face is facing; highlight the one or more segments to provide visual feedback to the user; cause the camera system to capture one or more enrollment images corresponding to a pose of the user's face facing the approximate direction; generate embeddings corresponding to the one or more enrollment images; and responsive to an indication that embeddings have been generated for the pose, provide an indication that the one or more segments are complete.

According to another aspect, there is provided a computer-readable storage media comprising instructions that, when executed, configure at least one processor of a user device to: display a preview image, captured by a camera system of the user device, via a display device during an enrollment process for face authentication; cause a two-dimensional (2D) object to be overlaid over the preview image, the 2D object having a region indicating an approximate orientation for a user to position their face relative to the camera system; responsive to a determination that the user's face is positioned at the approximate orientation, remove the 2D object and present a three-dimensional (3D) tracking window as an overlay over the preview image, the 3D tracking window having a plurality of segments; track an approximate direction that the user's face is facing relative to the camera; based on the tracking: highlight one or more segments of the plurality of segments of the 3D tracking window that correspond to the approximate direction that the user's face is facing; cause the camera system to capture one or more enrollment images of the user's face facing the approximate direction; generate one or more embeddings based on the one or more enrollment images; store, in a secure storage unit, the one or more embeddings in a fixed grid of pose cells corresponding to various facial poses for use in facial authentication; and responsive to the generation and storage, provide an indication that the one or more segments are complete.

The computer-readable medium of either aspect may further comprise the following features. The embeddings may include a pair of 2D and 3D embeddings for a pose of the user's face facing the approximate direction; and the at least one processor may be configured to store the embeddings in a fixed grid of pose cells, which are characterized by pan angle and tilt angle.

It will be appreciated that features described in the context of one aspect may be combined with features of another aspect. For example, the features of the method aspect may be implemented by the system aspect and/or the computer-readable storage media aspect.

This summary is provided to introduce simplified concepts concerning grid-based enrollment for face authentication, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of grid-based enrollment for face authentication are described in this document with reference to the following drawings. The same numbers are used throughout the drawings to reference like features and components:

FIG. 6 illustrates an example implementation of a fixed grid for storing embeddings corresponding to different face poses.

DETAILED DESCRIPTION

Overview

Figure 1:
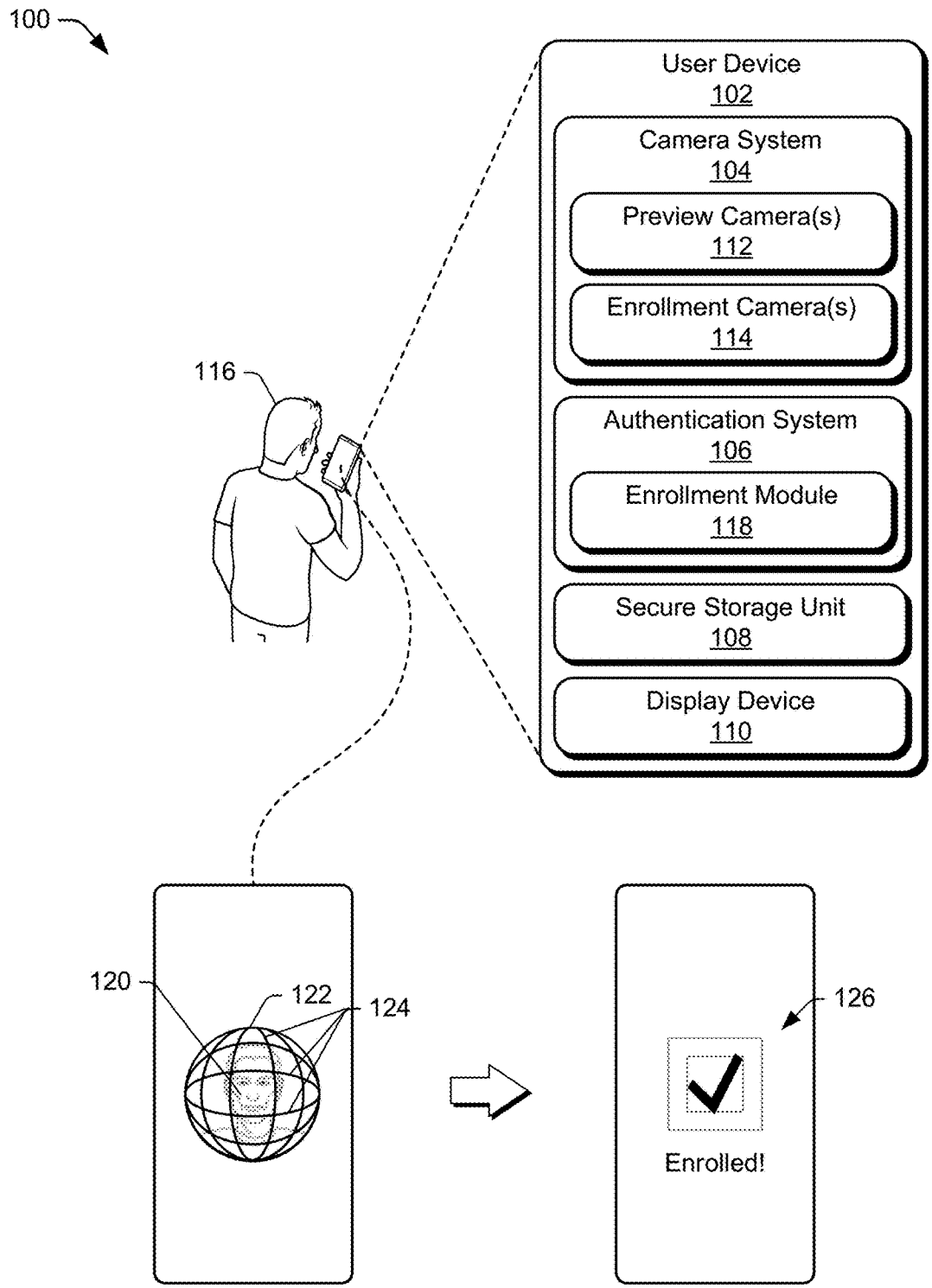
FIG. 1 illustrates an example environment in which techniques for grid-based enrollment for face authentication can be implemented.

Devices capable of three-dimensional (3D) face enrollment generally do not communicate well to users regarding how to orient their face toward specific angles relative to a camera of the device, which can degrade the user experience and restrict the user's ability to unlock the device using face authentication. This document describes techniques and systems that enable grid-based enrollment for face authentication, which provides a unique, intuitive, and non-trivial way to direct the user's head movements in a 3D manner to significantly enhance the user experience during face enrollment.

In aspects, a method for a grid-based enrollment for face authentication by a user device is disclosed. The method includes, responsive to a user input, presenting a preview image, captured by a camera, via a display device, the presenting to initiate enrollment for face authentication. The method also includes overlaying a two-dimensional (2D) object over the preview image, the 2D object having a region indicating an approximate orientation for a user to position their face relative to the camera. In addition, the method includes, responsive to a determination that the user's face is positioned at the approximate orientation, removing the 2D object and presenting a three-dimensional (3D) tracking window as an overlay over the preview image, the 3D tracking window having a plurality of segments. Also, the method includes tracking an approximate direction that the user's face is facing relative to the camera. Further, the method includes, based on the tracking: highlighting one or more segments of the plurality of segments of the 3D tracking window that correspond to the approximate direction that the user's face is facing; capturing one or more enrollment images of the user's face facing the approximate direction; generating one or more embeddings based on the one or more enrollment images; storing, in a secure storage unit, the one or more embeddings in a fixed grid of pose cells corresponding to various facial poses for use in face authentication; and responsive to generation and storage of the one or more embeddings, providing an indication that the one or more segments are complete.

In aspects, a user device is disclosed. The user device includes a camera system, a display device, and a processor and memory. The camera system may be configured to capture images of a face of a user for face authentication. The display device may be configured to display a preview image including the user's face. The processor and memory can implement an enrollment module configured to, responsive to initiation of an enrollment process, cause a two-dimensional (2D) object to be overlaid over the preview image, the 2D object comprising a center region indicating an approximate orientation for the user to position their face relative to the camera system. The enrollment module may also be configured to, responsive to a determination that the user's face is positioned within the center region, present a three-dimensional (3D) tracking window as an overlay over the preview image, the 3D tracking window having a plurality of segments, the plurality of segments persisting to correspond to an approximate direction that the user's face is facing relative to the camera system. In addition, the enrollment module is configured to track the approximate direction that the user's face is facing; determine one or more segments of the plurality of segments that correspond to the approximate direction that the user's face is facing; highlight the one or more segments to provide visual feedback to the user; cause the camera system to capture one or more enrollment images corresponding to a pose of the user's face facing the approximate direction; generate one or more embeddings corresponding to the one or more enrollment images; and responsive to an indication that the one or more embeddings have been generated, provide an indication that the one or more segments are complete.

In aspects a computer-readable storage media is disclosed. The computer-readable storage media comprises instructions that, when executed, configure at least one processor of a user device to display a preview image, captured by a camera system of the user device, via a display device during an enrollment process for face authentication. The instructions also configure the at least one processor to cause a two-dimensional (2D) object to be overlaid over the preview image, the 2D object comprising a center region indicating an approximate orientation for a user to position their face relative to the camera system. In addition, the instructions configure the at least one processor to, responsive to a determination that the user's face is positioned within the center region, present a three-dimensional (3D) tracking window as an overlay over the preview image, the 3D tracking window having a plurality of segments, the plurality of segments persisting to correspond to an approximate direction that the user's face is facing relative to the camera system. Also, the instructions configure the at least one processor to track the approximate direction that the user's face is facing; identify one or more segments of the plurality of segments that correspond to the approximate direction that the user's face is facing; highlight the one or more segments to provide visual feedback to the user; cause the camera system to capture one or more enrollment images corresponding to a pose of the user's face facing the approximate direction; generate embeddings corresponding to the one or more enrollment images; and responsive to an indication that embeddings have been generated for the pose, provide an indication that the one or more segments are complete.

These are but a few examples of how the described techniques and devices may be used to enable grid-based enrollment for face authentication. Other examples and implementations are described throughout this document. The document now turns to an example operating environment, after which example devices, methods, and systems are described.

Operating Environment

FIG. 1 illustrates an example environment 100 in which techniques enabling a grid-based enrollment for face authentication can be implemented. The example environment 100 includes a user device 102 (e.g., electronic device), which includes, or is associated with, a camera system 104, an authentication system 106, a secure storage unit 108, and a display device 110.

As further described below, the camera system 104 can include one or more preview cameras 112 and one or more enrollment cameras 114. The preview cameras 112 may be different than the enrollment cameras 114 or may be implemented as the same set of cameras. In some implementations, the preview cameras 112 may be color cameras (also referred to as Red, Green, Blue (RGB) cameras) to capture an RGB preview image of a face of a user 116, which can be displayed via the display device 110. The preview image acts as a "selfie" preview and may be a live preview at any suitable frame rate to mirror the user's head movements. The enrollment camera(s) 114 may be near-infrared (NIR) cameras configured to capture NIR image data of the user's face for face authentication. Alternatively, the enrollment cameras 114 may be RGB cameras configured to capture RGB image data of the user's face for face authentication.

The authentication system 106 is configured to implement an enrollment module 118. The enrollment module 118 can configure the camera system 104 to capture, using the preview camera 112, live RGB preview images (e.g., preview image 120) of the user's face for display via the display device 110, and to capture, using the enrollment camera 114, NIR image data representing the user's face. Alternatively, the preview images may be computer-generated imagery (e.g., an avatar) version of the user instead of an actual camera capture. A 3D avatar of the user's face may be based on a 3D map of the user's face. The user device 102 may draw a skin image of the user's face on a 3D version of a face, such as a digital mannequin or cartoon character. Any suitable 3D image that reflects where the user 116 is looking and maps or tracks the user's head movements may be used.

Generally, NIR refers to light within a range of wavelengths between approximately 750 nanometers and 2500 nanometers that is invisible to the human eye. The enrollment module 118 is also configured to use a neural network (e.g., convolutional neural network) or other type of machine-learned model, trained using machine-learning techniques, to generate embeddings from the captured NIR image data. Each embedding is an n-dimensional vector representing the user's face for one particular pose. As is described further below, these embeddings are stored in the secure storage unit 108 for later use in face authentication to unlock the user device 102. Generally, multiple embeddings are generated and stored to enable the user to unlock the user device 102 with any of a variety of different poses.

When the user 116 initiates an enrollment process for face authentication, the preview image 120 is presented as a two-dimensional (2D) image of the user 116. In addition, the enrollment module 118 can present a 3D tracking window 122 as an overlay over the preview image 120. The 3D tracking window 122 includes multiple segments 124. As is described further below, the 3D tracking window 122 provides rapid visual feedback in a 3D manner that intuitively instructs the user 116 to rotate or roll their head. Rather than directing the user, in a 2D manner, to translate (e.g., shift) their head left, right, up, or down, the 3D tracking window 122 directs the user 116 to roll or rotate their head by facing or gazing in various directions relative to the user device 102 to enable the camera system 104 to capture different angles of the user's face for the enrollment process. The 3D tracking window 122 provides these directions to the user 116 by using a curved grid and highlighting one or more segments of the curved grid that correspond to an approximate direction that the user's face is facing (e.g., an approximate direction that is normal to the user's face). As the user 116 rolls their head around, new segments are highlighted to follow the user's gaze (similar to a cursor following an input mechanism, such as a computer mouse). Further, highlighting on old segments (segments that the user 116 did look toward but which the user 116 is no longer looking toward) is removed.

If the enrollment process is missing certain angles of the user's face, the 3D tracking window 122 can indicate to the user a particular direction to face toward to provide a corresponding view of their face for the camera system 104. Further details are described below. When a sufficient number of embeddings are generated and stored, the enrollment module 118 determines that the enrollment is complete. Responsively, the user device 102 displays an indication 126 to inform the user 116 of the successful completion of enrollment. The indication 126 may include any suitable indication, such as visual (e.g., text, image, video), audio, haptic, or any combination thereof.

Figure 2:
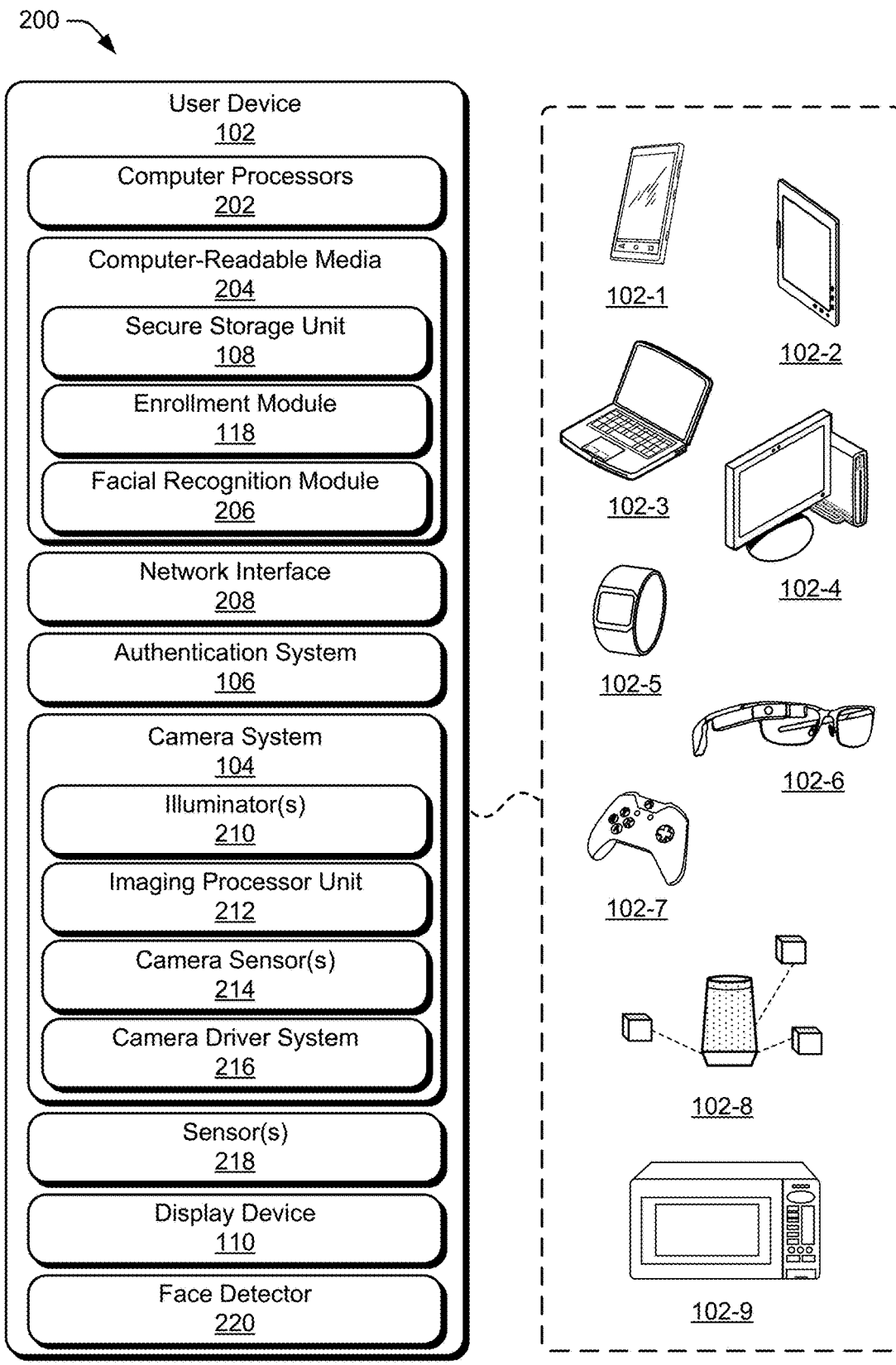
FIG. 2 illustrates an example implementation of the user device of FIG. 1 in more detail.

In more detail, consider FIG. 2, which illustrates an example implementation 200 of the user device 102 that can implement grid-based enrollment for face authentication.

The user device 102 of FIG. 2 is illustrated with a variety of example devices, including a smartphone 102-1, a tablet 102-2, a laptop 102-3, a desktop computer 102-4, a computing watch 102-5, computing spectacles 102-6, a gaming system 102-7, a home-automation and control system 102-8, and a microwave 102-9. The user device 102 can also include other devices, such as televisions, entertainment systems, audio systems, automobiles, drones, track pads, drawing pads, netbooks, e-readers, home security systems, and other home appliances. Note that the user device 102 can be wearable, non-wearable but mobile, or relatively immobile (e.g., desktops and appliances).

The user device 102 also includes one or more computer processors 202 and one or more computer-readable media 204, which includes memory media and storage media. Applications and/or an operating system (not shown) implemented as computer-readable instructions on the computer-readable media 204 can be executed by the computer processors 202 to provide some or all of the functionalities described herein. For example, the computer-readable media 204 can include the enrollment module 118 and a facial recognition module 206. The facial recognition module 206 is configured to authenticate a user to unlock the user device 102 by generating embeddings from captured images of the user's face during a face-authentication attempt and comparing the captured embeddings to enrolled embeddings stored in the secure storage unit 108.

The computer-readable media 204 includes secure storage, such as the secure storage unit 108, which is not accessible by processes or applications in the user space. The secure storage unit 108 is configured to store security data (e.g., user credentials) used for privacy controls, such as controls to unlock the user device 102 (including face authentication data, password/passcode information, fingerprint data, and so on). Although this security data can be used to authenticate the user 116 to unlock the user device 102 using face authentication, password/passcode authentication, fingerprint authentication, and so on, personally identifiable information about the user 116 cannot be obtained by the security data. Specifically, the user 116 cannot be identified by the security data. Rather, with previously obtained explicit permission from the user, the security data is used to determine whether data received from a user attempting to unlock the phone matches stored profile data representing a user that set up the security on the user device 102. In an example, the embeddings generated from captured images (NIR images or RGB images) of the user's face are numerical vector representations of facial features of the user 116 and are used during a face-authentication attempt for comparison to enrolled embeddings to locate a match.

The user device 102 may also include a network interface 208. The user device 102 can use the network interface 208 for communicating data over wired, wireless, or optical networks. By way of example and not limitation, the network interface 208 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

Various implementations of the authentication system 106 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof. As described in further detail below, the authentication system 106 can, in a secure mode, enroll the user 116 in face authentication by capturing image data of the user's face, generating security data corresponding to the image data, and storing the security data in a secure storage. The authentication system 106 can also compare authentication data received from the user 116 to the stored security data for authenticating the user 116 to unlock the user device 102. In some aspects, the authentication system 106 generates the authentication data using image data obtained from the camera system 104 and provides the authentication data to the secure storage to enable the secure storage to compare the authentication data to the stored security data and determine if there is a match.

The camera system 104 is implemented to capture RGB images to provide a preview image (e.g., the preview image 120 from FIG. 1). The camera system 104 is also implemented to capture image data (e.g., NIR image data or RGB image data) usable to generate a three-dimensional depth map of an object, such as a user's face. The camera system includes one or more illuminators 210, an imaging processor unit 212, one or more camera sensors 214, and a camera driver system 216.

The one or more illuminators 210 can include a dot projector (not shown), a flood illuminator (not shown), and an RGB light (not shown) such as a light-emitting diode. The flood illuminator illuminates a subject with NIR light. The camera sensors 214 capture an image of the subject based on the NIR light output by the flood illuminator. The dot projector projects a plurality (e.g., hundreds or thousands) of NIR dots onto the subject and the camera sensors 214 capture an image of the resulting dot pattern. The imaging processor unit 212 reads the NIR image and the dot pattern and generates a three-dimensional facial map. When multiple (e.g., two) camera sensors 214 are used, the imaging processor unit 212 calculates a difference between matching points on the different captured images, which provides a depth for respective pixels usable for generating the three-dimensional facial map.

The camera driver system 216 enables communication between the camera system 104 and other components of the user device 102, such as the computer processors 202, the enrollment module 118, and the authentication system 106. The camera driver system 216 can be initiated by any suitable trigger, such as a user input received via an actuated control or pressed button, or a signal received from one or more sensors 218. In an example, proximity sensors can transmit a signal indicating that the user 116 is proximate to the user device 102 such that the user may attempt to unlock the user device 102 using face authentication.

The one or more sensors 218 of the user device 102 can include any of a variety of sensors, such as an audio sensor (e.g., a microphone), a touch-input sensor (e.g., a touchscreen), an image-capture device (e.g., a camera or videocamera), proximity sensors (e.g., capacitive sensors), or an ambient light sensor (e.g., photodetector). In at least some implementations, the user device 102 can include a radar system (not shown) to detect a proximity of the user 116 to the user device 102, and based on that proximity, initiate one or more components and/or functions, such as initiating the camera system 104 and the authentication system 106 to initiate a face-authentication attempt.

The user device 102 can also include a display device, such as the display device 110. The display device 110 can include any suitable display device, such as a touchscreen, a liquid crystal display (LCD), thin film transistor (TFT) LCD, an in-place switching (IPS) LCD, a capacitive touchscreen display, an organic light-emitting diode (OLED)

display, an active-matrix organic light-emitting diode (AMOLED) display, super AMOLED display, and so forth.

In at least some aspects, the user device 102 also includes a face detector 220. The face detector 220, typically implemented in programmable hardware for speed but which could also be implemented as a combination of hardware and software, is configured to detect the user's face in the preview image 120, and more specifically, detect orientation information (e.g., relative position information) associated with the user's face in the preview image 120. The orientation information can be used to determine whether the user's face is positioned approximately in the center of the preview image 120.

These and other capabilities and configurations, as well as ways in which entities of FIG. 1 act and interact, are set forth in greater detail below. These entities may be further divided, combined, and so on. The environment 100 of FIG. 1 and the detailed illustrations of FIG. 2 through FIG. 10 illustrate some of many possible environments and devices capable of employing the described techniques.

Example Implementations

Figure 3:
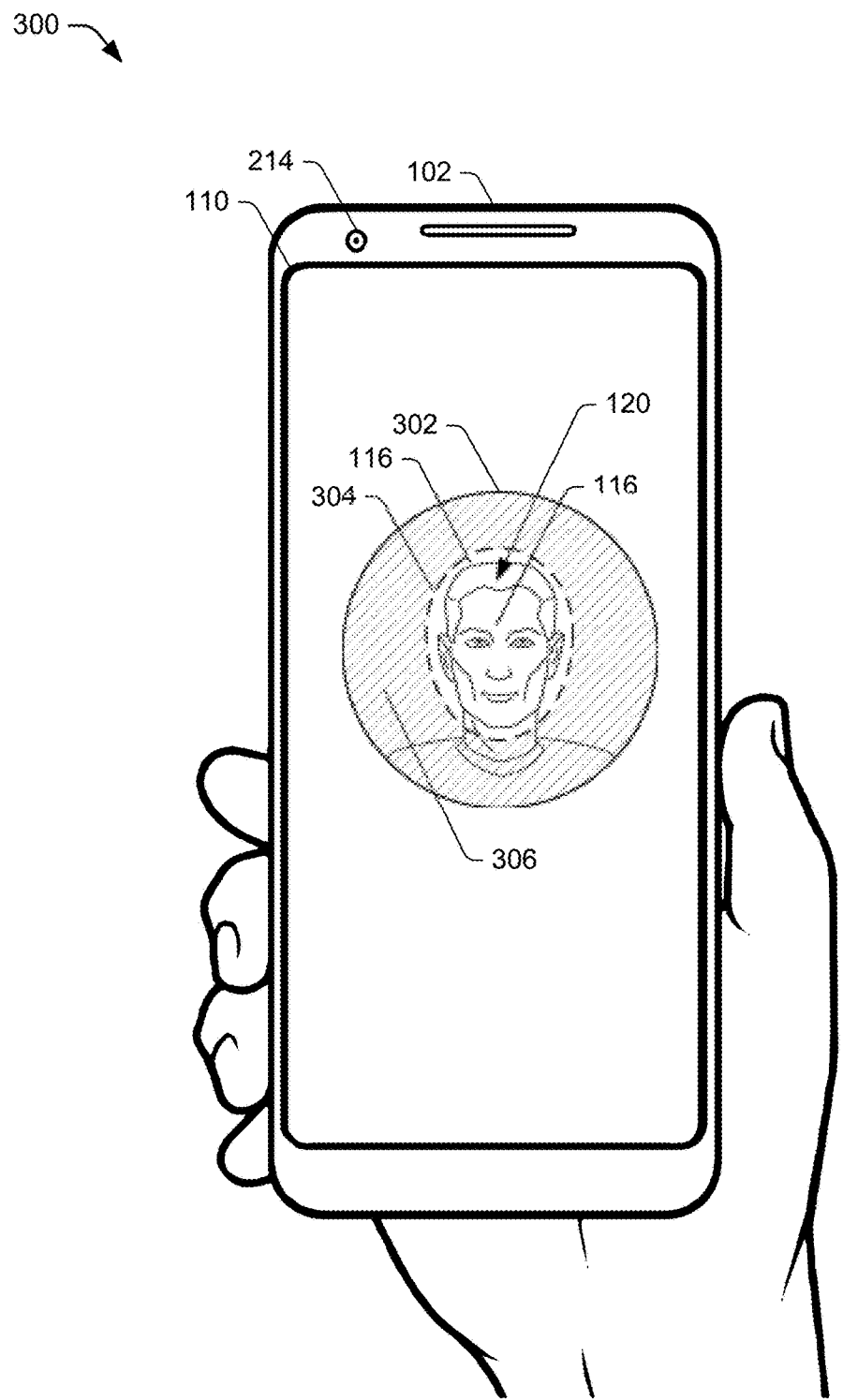
FIG. 3 illustrates an example implementation of a preview image overlaid with a two-dimensional object to direct translational positioning of a user's head.

FIG. 3 illustrates an example implementation 300 of a preview image overlaid with a 2D object to direct translational positioning of a user's head. The implementation 300 may be referred to as an alignment stage of the enrollment process, which directs the user 116 to align their face with the camera sensor 214. Although a single camera sensor 214 is shown for illustration purposes, multiple camera sensors 214 can be used and positioned at various locations on the user device 102. When the enrollment process begins, the camera sensor 214 (e.g., the preview camera 112) captures the preview image 120 for display via the display device 110. Generally, the camera sensor 214 used is a front-facing camera such that the user 116 can see a mirrored image of themselves via the display device 110. Alternatively, a rear-facing camera can be used.

A 2D object 302 is presented as an overlay over the preview image 120. The 2D object 302 includes a center region 304 indicating an approximate orientation (e.g., relative position) for the user to position their head or face relative to the camera sensor 214. The 2D object 302 directs the user 116 to translationally move (e.g., shift left, right, down, up, forward, and/or back) their head to approximately center their face in the center region 304, which represents a correct field of view for the camera sensor 214. This may be helpful to some users if the camera sensor 214 is offset from the middle of the user device 102 because the user 116 may not realize that their face is not centered relative to the camera sensor 214, even though the user's face may be centered with respect to the display device 110. In some aspects, the 2D object 302 may be semiopaque, patterned, shaded, or have a translucent color in other regions 306 around the center region 304. In contrast, the center region 304 of the 2D object 302 may be clear or highly transparent. This contrast between the center region 304 and the other regions 306 provides an intuitive and inferential indication to the user 116 as to where to translationally position their face.

Figure 4:
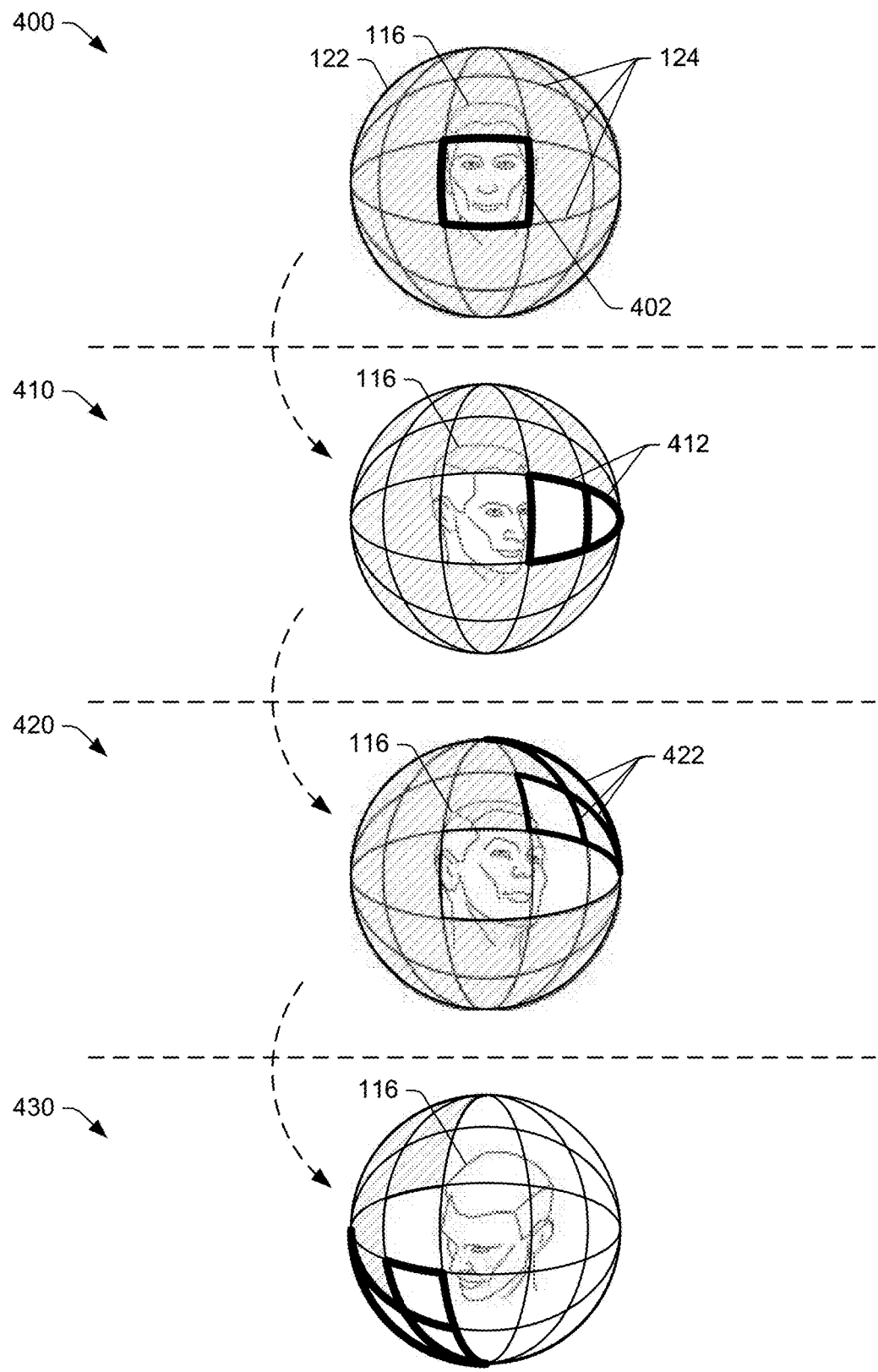
FIG. 4 illustrates an example implementation of grid-based enrollment for face authentication.

When the user device 102 determines that the user's face in the preview image 120 is positioned substantially within the center region 304, the 2D object 302 is removed and the 3D tracking window 122 is overlaid over the preview image 120, as illustrated in FIG. 4.

FIG. 4 illustrates an example implementation of grid-based enrollment for face authentication. In particular, FIG. 4 illustrates several views 400, 410, 420, 430 that represent the 3D tracking window 122 tracking head movements of the user 116 during the enrollment process. This implementation may be referred to as an enrollment stage of the enrollment process. As mentioned above, the 3D tracking window 122 includes a curved grid having a plurality of segments 124. The segments may be shaped to correspond to a hemisphere or other 3D object that directs the user 116 to roll or rotate their head. In some aspects, the segments 124 may be implemented as a plurality of dots uniformly distributed at grid centers or on a hemisphere or other pattern.

Initially, the segments 124 may be semiopaque, patterned, shaded, or have a translucent color that enables the preview image 120 to be partially viewable underneath the 3D tracking window 122. The 3D tracking window 122 uses a machine-learned algorithm to track an approximate direction in which the user's face is facing. In view 400, a mirrored image of the user 116 is facing forward, directly toward the center of the 3D tracking window 122. In response, the user device 102 highlights one or more segments 124 corresponding to the approximate direction that the user's face (and the mirrored image of the user's face presented in the preview image 120) is facing. Here, segment 402 is highlighted with a thickened border. In addition, the opaqueness of the highlighted segment 402 is removed. This highlighting and/or opaqueness modification provide visual feedback to the user 116 to indicate that that particular segment 402 is complete. A completed segment corresponds to an embedding that has been generated for the user's face at a corresponding pose. For instance, as the user faces toward the 3D tracking window 122 (effectively facing toward the camera sensor 214 from FIG. 3), the enrollment camera 114 captures one or more enrollment images of the user's face and generates one or more embeddings for that pose. As is described further below with respect to FIG. 6, underlying machine learning models fill in a fixed grid of face poses with the embeddings. This fixed grid of face poses, when completed, contains sufficient information of various angles of the user's face, which are expected to be used during a face-authentication attempt.

The user 116 may orient their head at different angles, such as by rolling their head around, to cause the preview image 120 to face toward different segments of the 3D tracking window 122, as if the face in the preview image 120 is looking at different portions of the inside of the hemisphere. Embeddings are captured as the user makes these movements and the 3D tracking window 122 provides visual feedback to indicate the user's progress. For example, in the view 410, the user turns their head to their right and the mirrored image of the user's face turns to its left. In response, segments 412, corresponding to the approximate direction that the user 116 is now facing, are highlighted. Then, in view 420, the user 116 looks upward and to their right, causing the mirrored image of the user's face to face upward and to its left. Responsively, new segments 422 are highlighted that correspond to the approximate direction that the user 116 is facing and that the mirrored image of the user's face is facing.

In some implementations, the user device 102 uses a high frame rate (e.g., approximately ten or more frames per second) for highlighting the segments corresponding to the approximate direction that the user's face is facing. Accordingly, the corresponding segments fade in rapidly, providing rapid visual feedback that tracks the user's gaze (similar to a cursor tracking movements of a computer mouse). As the user's gaze changes directions, however, the highlighting of the highlighted segments, which are no longer in the approximate direction of the user's gaze, is slowly faded out and/or removed. Thus, an animation speed of the fading in is greater than the animation speed of the fading out. This difference in animation speed adds continuity to enhance the user experience.

In view 430, the user 116 looks downward and to their left and the mirrored image of the user's face faces downward and to its right. As segments are completed, they remain clear to indicate to the user 116 that they are completed. Incomplete segments continue to be semiopaque to direct the user 116 to look in the corresponding directions to provide the user device 102 with specific poses usable to generate the embeddings for the enrollment process. In some examples, the user device 102 may provide progress updates in addition to the opacity change (e.g., increased transparency) of the completed segment. The progress updates may include haptic feedback when a particular segment is completed. For example, a haptics vibrator may be initiated to vibrate the user device 102 when one or more of the segments are completed. This may be useful when the user has poor eyesight (e.g., removed glasses during the enrollment process) and cannot clearly see the display on the display device 110 because the haptic feedback can indicate to the user that they are making progress in the enrollment process. Alternatively or in addition, the user device 102 may provide audible feedback. For example, text-to-speech may be implemented to provide clues about the user's progress in the enrollment process.

Continuing with the example in FIG. 4, the user 116 may then look in an upward left direction, causing the mirrored image to look upward to its right, to provide one or more final poses to complete the enrollment process. As the user 116 progresses through the enrollment process and more and more segments are completed, the opacity of the incomplete segments may be increased to make the incomplete segments more obvious to the user 116. This may be helpful in situations where the background of the preview image 120 is substantially the same color as the segment, making it difficult for the user 116 to identify which segment is incomplete. Making the incomplete segment entirely opaque with a particular color enables the user to more easily identify the incomplete segment and face the corresponding direction to complete that segment.

In one example, the incomplete segments of the 3D tracking window 122 may initially be substantially transparent to ensure that the user 116 can see their face in the preview image 120. Over time and with progress, the opacity of the incomplete segments may be increased to ensure that the user can identify remaining incomplete segments.

In some implementations, the enrollment process may be completed without completing each and every segment 124. Some users may not be able to provide extreme angles of their face, and therefore are not likely to attempt face authentication using such extreme angles. If the enrollment module 118 determines that a particular segment near an edge of the 3D tracking window 122 is incomplete and multiple segments adjacent to the particular segment are completed, then the enrollment module 118 can indicate to the user that the particular segment is complete without actually acquiring a corresponding enrollment image or embedding. The enrollment module 118 attempts to capture the most-likely poses that the user 116 may use during a face-authentication attempt. Therefore, after a threshold number of segments are completed (e.g., the center nine segments of a 5×5 grid) and a predefined duration of time has expired, the user device 102 may consider the enrollment process to be sufficiently complete. This does not reduce the security for face authentication but may reduce the number of poses usable by the user during a face-authentication attempt.

In some aspects, the enrollment module 118 can analyze specific regions of the user's face (e.g., a mouth and lip region, an eyebrow region, a pupil region, etc.) when generating embeddings. This may enable the user to use specific facial poses, such as frowning, smiling, wrinkling their nose, raising eyebrows, looking left or right, or any other facial expression during the enrollment process, which the user 116 may be required to reproduce during a subsequent face-authentication attempt to unlock the user device 102.

During enrollment, the enrollment module 118 may request the user to open their eyes. If the user's eyes are closed, enrollment progress may temporarily stop and the user device 102 may display a message to the user 116 requesting that the user 116 open their eyes during the enrollment process. Other messages may include a request to remove sunglasses or a hat during the enrollment process in order to complete the enrollment. Some messages may include error messages, such as a request that the user 116 move their head in a particular direction relative to the user device 102. The message may be a visual message displayed on the display device 110, an audio message, or a combination thereof.

In some aspects, a simplified version of the enrollment process may be implemented, such as for accessibility. The simplified version captures a single snapshot of the user's face during the alignment stage discussed with respect to FIG. 3 and provides audible cues to indicate whether the user's face is in focus. This simplified version may not complete all of the segments but may complete a sufficient number of segments for enrollment.

Figure 5:
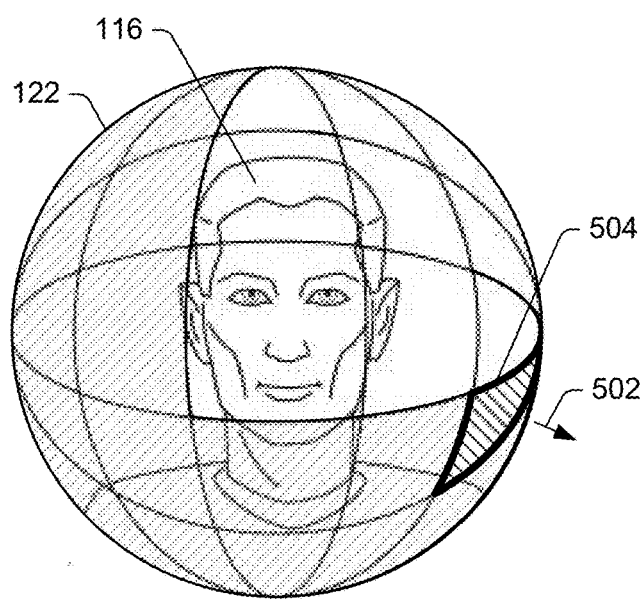
FIG. 5 illustrates an example implementation of a grid-based enrollment for face authentication, with visual prompts for assistance.

FIG. 5 illustrates an example implementation 500 of a grid-based enrollment for face authentication, with visual prompts for assistance. In this example, the user 116 has partially completed enrollment. If, after completing a segment, a predefined period of time expires without completing a new segment, a visual prompt is displayed to direct the user 116 to turn their head in a direction toward one or more incomplete segments. The prompt may include an arrow 502 or other indicator displayed proximate to, or on, an incomplete segment. The indicator may be displayed outside a border of the 3D tracking window 122. An example indicator 504 may include graphically emphasizing the incomplete segment, such as by changing a color, opacity, brightness, or a combination thereof.

The indicator may correspond to any suitable incomplete segment. In one example, the user device 102 analyzes the segments in a clockwise or counterclockwise direction and associates the indicator with a first encountered incomplete segment. Alternatively, the user device 102 may analyze the segments in rows or columns. Any suitable pattern, including random selection, may be used to locate an incomplete segment to associate with the indicator. The enrollment module 118 can use a variety of different approaches for identifying and indicating incomplete segments, some examples of which include nod up/down, larger/smaller circle, paint by number, clock face, zig-zag, etc.

FIG. 6 illustrates an example implementation of a fixed grid 600 for storing embeddings corresponding to different face poses. Enrolling with embeddings (2D and 3D) that correspond to a diverse set of face poses dramatically improves false acceptance rate and false recognition rate over conventional systems that use a single face pose for face authentication. A user's facial pose may be defined by various attributes, including pan angle and tilt angle. The pan angle refers to the user turning their head left or right. The tilt angle refers to facing up or down.

To capture a balanced spread of poses during enrollment, the user device 102 defines a static list of pose cells in the fixed grid 600 and causes the user to continue the enrollment process until a sufficient amount of cells are filled. Each cell maps to a pair of 2D/3D embeddings for a face. Each cell is characterized by an origin pan and tilt angle. In an example, a pose can be associated with a cell if the pose is within a circle with a radius of ten of the pan and tilt of the cell. In some aspects, a single pose can be associated with multiple cells. For example, if a new pose is (0, 0), then cells (0, 0), (0, 10), (10, 0), (0, −10), and (−10, 0) are within the accepted radius. It is noted that the described embodiments are not limited to a radius of ten. Rather, any suitable radius may be used that allows for the capture of a sufficient amount of face poses for face authentication.

The fixed grid 600 illustrated in FIG. 6 includes an initial set of hardcoded pose cells, where each cell corresponds to (pan-origin angle, tilt-origin angle). Each cell maps to a pair of 2D/3D embeddings for a particular face capture (with many cells potentially pointing to one pair if the pose is overlapping). For example, table 650 illustrates example poses with corresponding 2D and 3D embeddings. The first two example poses (10, 0) and (0, 0) each point to the same pair of 2D/3D embeddings. The third example pose (20, −10), however, points to a different pair of 2D/3D embeddings.

In some aspects, pose information may not be required past enrollment. In this case, a list of unique embeddings may be stored in the secure storage unit 108 from FIG. 1 without pose information. If the secure storage unit 108 (e.g., internal storage) does not have sufficient space to store the pose angles and redundant embeddings, the poses can be stored in an external storage space, which is external to the secure storage unit 108, and mapped to pointers stored in the secure storage unit 108.

As mentioned, each image to be enrolled has an embedding and a pose associated with it. Each pose cell maps to a single embedding, based on the pose associated with that embedding. Each embedding can, however, map to multiple cells. In aspects, a heat map can be used to determine the most-likely poses, which can guide the enrollment process. This helps to ensure that when the user enrolls, the user device 102 captures at least the most-important grid cells, even if the user's face is off-center.

A cell update strategy defines when a new embedding maps to a cell that has already been filled by another embedding. For new poses, the enrollment module 118 updates each cell in such a way that an empty cell is filled with an embedding corresponding to the new pose if the new pose is within a range of the empty cell, rather than updating an already-filled cell with the embedding.

An example update strategy includes a keep-oldest strategy, in which the cells are filled with embeddings by keeping the oldest and least-recently-inserted embeddings, while dropping the new embedding to avoid overwriting the already-enrolled embedding. According to the keep-oldest strategy, already-enrolled embeddings are not overwritten. Another example update strategy includes a keep-newest strategy, in which the cells are filled with embeddings by keeping the newest and most-recently-inserted embeddings, while overwriting the old embedding from the cells. According to the keep-newest strategy, one or more already-enrolled embeddings are overwritten if they overlap with the new embedding. Another example update strategy includes a keep-closest-pose strategy, in which cells that map to the embeddings are overwritten if the new pose is closer to the center of the cell than the previous pose.

In aspects, a stopping condition to trigger an end of the enrollment process may include any suitable measurement. Some example stopping conditions includes pose count, embedding count, heuristics, a user input completion, or a pigeon-hole principle. Using the pose count, the enrollment is stopped when exactly a predetermined number of cells (e.g., N pose cells) are filled. To illustrate this, imagine N=18 and 17 cells have already been filled. Because a single face can span multiple cells, the next enrolled face might map to a maximum of five new cells and consequently, the enrollment might complete with 22 cells filled. The pose count can avoid updating more cells than are needed for the enrollment.

Using the embedding count, enrollment is stopped when exactly a predetermined number of embeddings (e.g., N embeddings) are enrolled. This may allow more than N cells to be filled upon completion of the enrollment due to embeddings potentially mapping to multiple cells. However, the number of embeddings defining the stopping condition may be less than the number of pose cells.

The heuristics can be used along with some combination of the pose count and/or the embeddings count to ensure optimal cell coverage. For example, if the grid is divided into four cell quadrants, the heuristics may indicate whether all four cell quadrants are filled.

In some aspects, the user device 102 continues to collect embeddings until the enrollment process completes all stages, ignoring cells from subsequent stages, and then subsamples to enforce a threshold number of embeddings (e.g., 20 embeddings). If the pigeonhole principle is used, then the threshold number of embeddings may be 25 for a 5×5 fixed grid. For example, according to the pigeonhole principle, if n embeddings are distributed over n cells in such a way that no cell receives more than one embedding, then each cell receives exactly one embedding.

At any time during the enrollment process after at least one embedding is acquired, the user 116 can select to skip the remaining portion of the enrollment process and complete the enrollment without acquiring more embeddings. Based on this user input, the enrollment process can end and the user device 102 can use the at least one embedding for subsequent face-authentication attempts.

Figure 7:
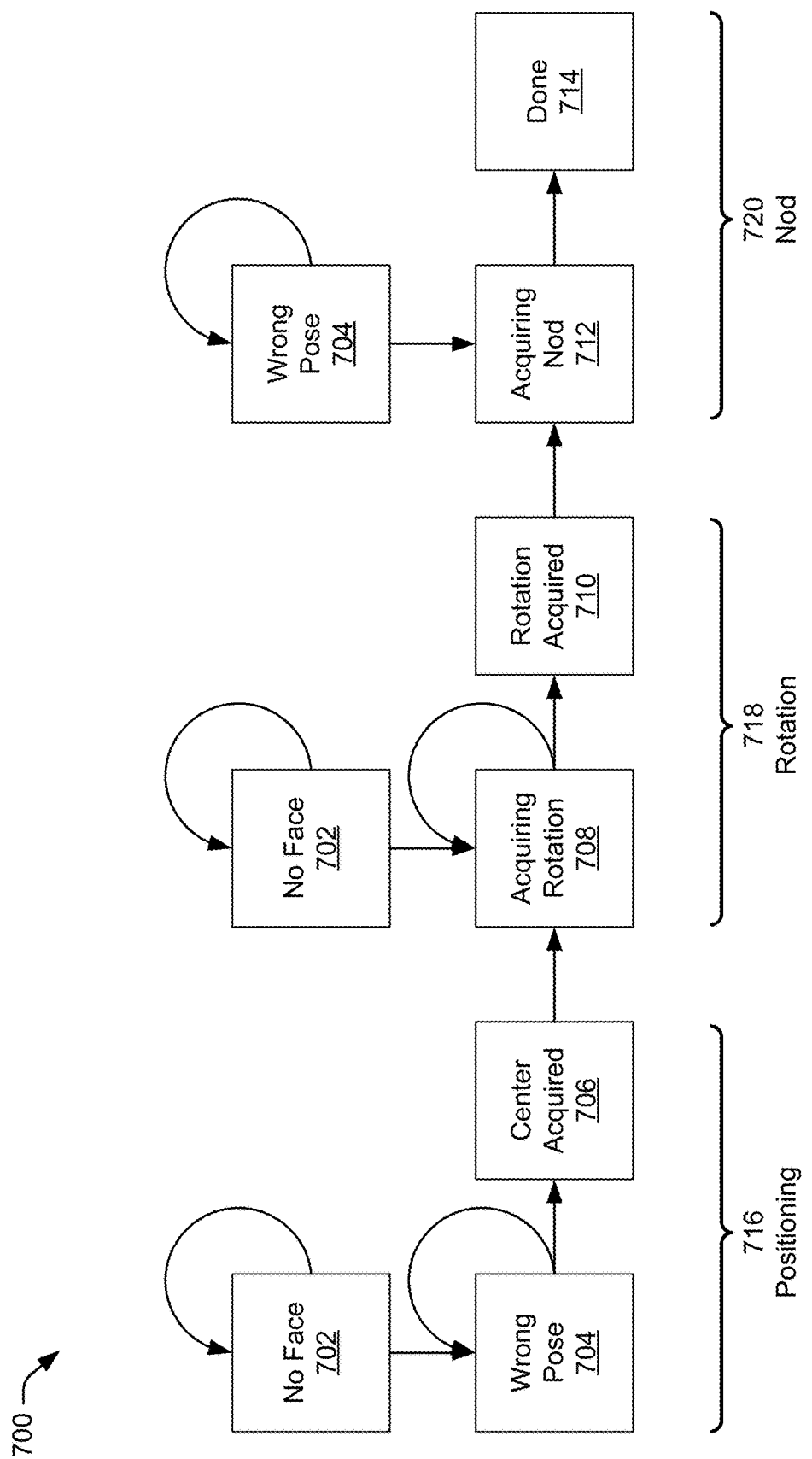
FIG. 7 illustrates an example state diagram corresponding to a grid-based enrollment for face authentication.

FIG. 7 illustrates an example state diagram 700 corresponding to a grid-based enrollment for face authentication. The state diagram 700 represents a set of messages sent in various stages of the enrollment process. The enrollment module 118 can initiate a display of any of a variety of different states to the user 116 based on an acquired pose during the enrollment process. Examples of displayable states include a no-face state 702, a wrong-pose state 704, a center-acquired state 706, an acquiring-rotation state 708, a rotation-acquired state 710, an acquiring-nod state 712, a done state 714, etc. The example states are divided into different sections, e.g., a positioning section 716, a rotation section 718, and a nod section 720.

The no-face state 702 indicates that the face is either not within a field of view of the camera or the quality of the image is low (e.g., too bright). The no-face state 702 is included in the positioning section 716 and the rotation section 718. The wrong-pose state 704 indicates that the pose (e.g., head up/down, left/right) is not centered. The wrong-pose state 704 can be implemented in the positioning section 716 and the nod section 720. The center-acquired state 706 indicates that a centered head was acquired and the enrollment process can proceed to a step with head rotation. The acquiring-rotation state 708 indicates that the enrollment module 118 is in the process of acquiring rotation. This has a counter of how many cells remain empty. The rotation-acquired state 710 indicates that the rotation was acquired and a predefined threshold number of cells are covered. The acquiring-nod state 712 indicates that the enrollment module 118 is in the process of acquiring nod. This has a counter of how many cells remain empty. The done state 714 indicates that the enrollment is complete.

Example Methods

Figure 8:
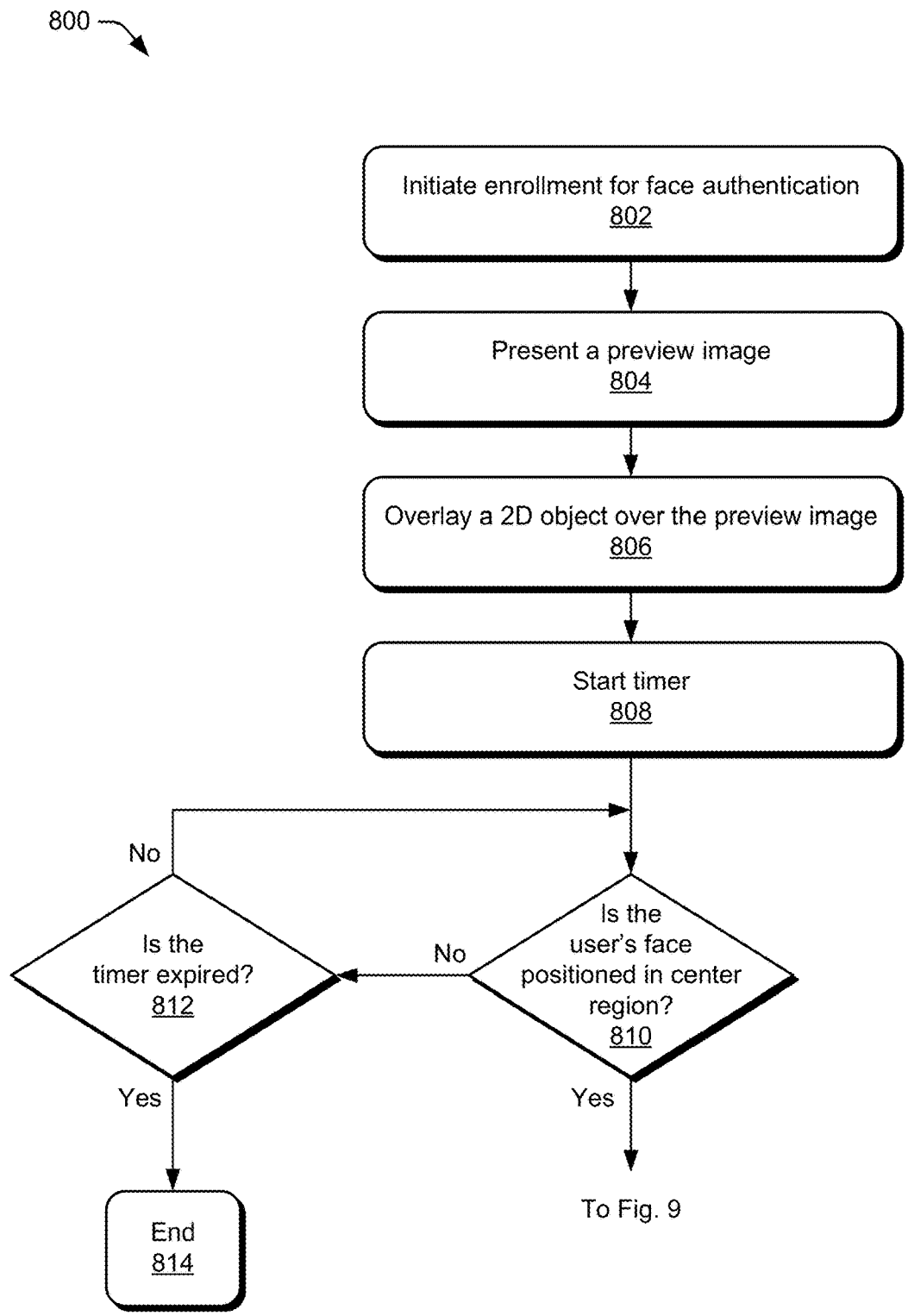
FIGS. 8 and 9 depict an example method for grid-based enrollment for face authentication.
Figure 9:
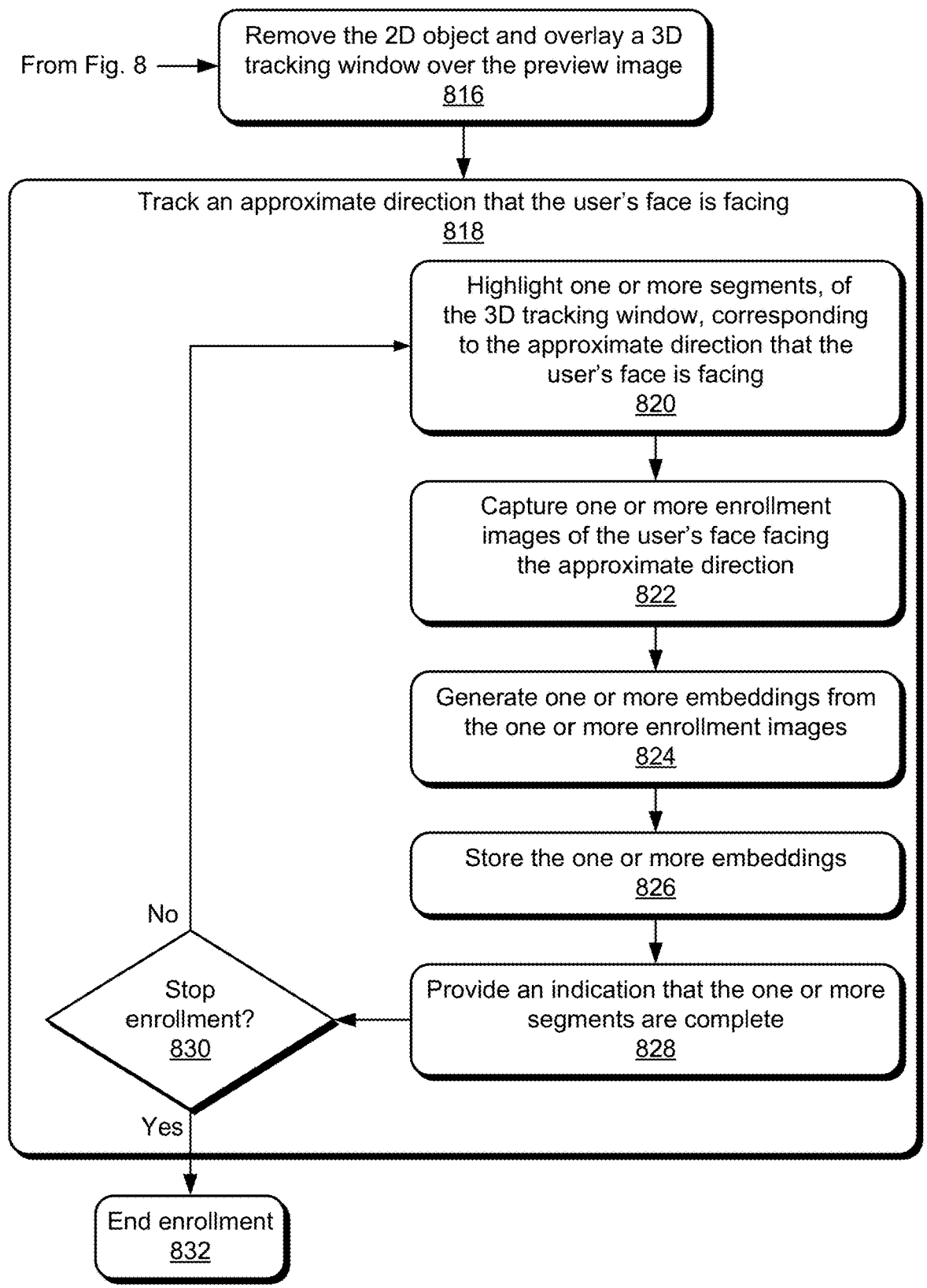

FIGS. 8 and 9 depict an example method 800 for grid-based enrollment for face authentication. The method 800 can be performed by the user device 102, which uses the enrollment module 118 to enroll the user 116 for face authentication.

The method 800 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in FIGS. 2-7, reference to which is made for example only. The techniques are not limited to performance by one entity or multiple entities operating on one device.

At 802, an enrollment process is initiated for a face-authentication attempt. For example, the camera driver system 216 of the user device 102 can be triggered to initiate the camera system 104 for face authentication. The trigger may include a user input to begin enrollment. In addition, the enrollment module 118 can request user credentials from the user 116 to confirm the user's identity for enrollment in face authentication.

At 804, a preview image is presented. For example, the preview camera 112 can capture the preview image 120 of the user 116 with the preview camera 112. As above, the preview image 120 may be a live preview of the user 116 or computer-generated imagery. The computer-generated imagery may be a 3D drawing of a generic face or cartoon character, or a skin image of the user's face on a 3D version of a face.

At 806, a 2D object is overlaid over the preview image. For example, the 2D object 302 may be overlaid over the preview image 120 via the display device 110. The 2D object 302 may include a center region that is visually distinguished from other regions of the 2D object 302 to direct the user 116 to translationally move their head left, right, up, down, forward, or backward relative to the user device 102 in order to position the image of their head in the preview image 120 in the center region of the 2D object 302.

At 808, a timer is started in response to the 2D object being overlaid over the preview image. The timer may be set for any suitable amount of time, including 10 seconds, 12 seconds, 25 seconds, 45 seconds, and so forth. This timer provides a predetermined amount of time for the user 116 to complete the step of positioning their head in the preview image 120 within the center region 304 of the 2D object 302.

At 810, a determination is made as to whether the user's face is positioned within the center region of the 2D object. If the user's face is not detected ("NO") within the center region 304, the method 800 proceeds to 812, which determines whether the timer is expired. If the timer is expired ("YES"), then at 814, the enrollment process may end. Alternatively, the enrollment process may skip to a single-capture enrollment flow.

If the timer is not expired ("NO"), then the method 800 loops back to 810 to continue monitoring the position of the user's face. When the user's face is detected ("YES") to be substantially positioned (e.g., 85% or more) within the center region 304 of the 2D object 302, the method 800 proceeds to FIG. 9 at 816.

At 816 in FIG. 9, the 2D object is removed and a 3D tracking window is overlaid over the preview image. For example, the 3D tracking window 122 is overlaid over the preview image 120 to provide rapid 3D visual feedback over a 2D image. The 3D tracking window 122 includes curved segments to visually provide 3D characteristics of the tracking window. The 3D tracking window 122 is configured to direct the user 116 to roll or rotate their head to enable the camera system 104 to capture images of the user's face at a plurality of different angles for enrollment in face authentication.

At 818, the user device 102 tracks an approximate direction that the user's face is facing. The approximate direction is a direction normal to the user's face, such as from the point of the user's nose, and can include a pan angle and a tilt angle in a predefined coordinate system. Alternatively, the coordinate system may be established based on a relative position between the user's face and the camera system 104.

At 820, the enrollment module highlights one or more segments, of the 3D tracking window, corresponding to the approximate direction that the user's face is facing. An example of highlighting the one or more segments 124 is illustrated in FIG. 4. As the user 116 moves their head around, the new segments are highlighted based on the approximate direction that the user's face is facing (e.g., a direction normal to the user's face) to provide a cursor-like object that maps to the approximate direction of the user's gaze.

At 822, one or more enrollment images of the user's face facing the approximate direction are captured. For example, the enrollment camera 114 may include one or more NIR cameras or RGB cameras to capture facial images usable for enrollment in face authentication. These facial images correspond to a particular orientation (pan angle and tilt angle) of the user's face relative to the enrollment camera 114.

At 824, one or more embeddings are generated from the one or more enrollment images. At 826, the one or more embeddings are stored. In aspects, the embeddings are stored in a fixed grid or array (e.g., the fixed grid 600) of pose cells. As described above with respect to FIG. 6, each cell maps to a pair of 2D/3D embeddings for a particular pose of a face.

At 828, the enrollment module 118 provides an indication that the one or more segments are complete. For example, the enrollment module 118 can cause a parameter of the highlighted segment to change, such as an opacity, a border thickness, a color, a pattern, or any combination thereof. Such a change to the highlighted segment indicates to the user that that particular segment is complete, which corresponds to an embedding having been captured for that particular pose.

At 830, the enrollment module 118 determines whether to stop enrollment. A variety of different stopping conditions can be used to trigger and end of the enrollment process. Some examples are described above in relation to FIG. 6 and include stopping conditions such as pose count, embedding count, heuristics, a user input completion, or a pigeon-hole principle. If a stopping condition is not satisfied ("NO"), then the method 800 returns to 820 to continue highlighting segments corresponding to the approximate direction that the user's face is facing as the user re-orients their head. If the stopping condition is satisfied ("YES"), then the enrollment process ends. As part of terminating the enrollment process, a confirmation of completion can be presented to the user 116 to indicate completion of the enrollment process. Any suitable confirmation can be used, such as visual, audible, haptic, or any combination thereof.

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Throughout this disclosure examples are described where a computing system (e.g., the user device 102, a client device, a server device, a computer, or other type of computing system) may analyze information (e.g., radar, inertial, and facial-recognition sensor data) associated with a user, such as the user's face. The computing system, however, can be configured to only use the information after the computing system receives explicit permission from the user of the computing system to use the data. For example, in situations where the user device 102 analyzes sensor data for facial features to authenticate the user 116, individual users may be provided with an opportunity to provide input to control whether programs or features of the user device 102 can collect and make use of the data. The individual users may have constant control over what programs can or cannot do with sensor data. In addition, information collected may be pre-treated in one or more ways before it is transferred, stored, or otherwise used, so that personally-identifiable information is removed. For example, before the user device 102 shares sensor data with another device (e.g., to train a model executing at another device), the user device 102 may pre-treat the sensor data to ensure that any user-identifying information or device-identifying information embedded in the data is removed. Thus, the user may have control over whether information is collected about the user and the user's device, and how such information, if collected, may be used by the computing device and/or a remote computing system.

Example Computing System

Figure 10:
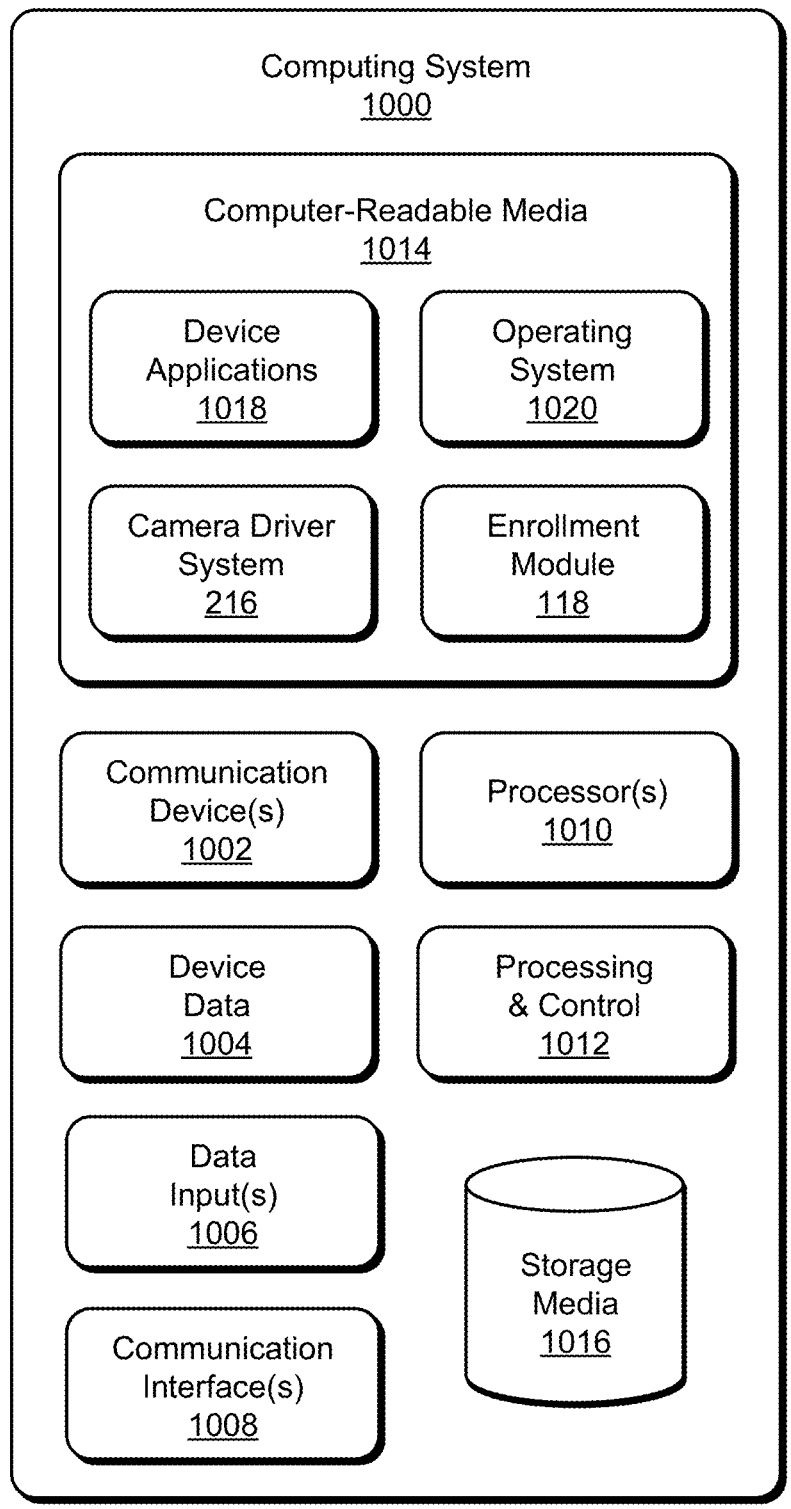
FIG. 10 illustrates an example computing system that can be implemented as any type of client, server, and/or electronic device as described with reference to FIGS. 1-9, in which techniques may be implemented that enable grid-based enrollment for face authentication.

FIG. 10 illustrates various components of an example computing system 1000 that can be implemented as any type of client, server, and/or electronic device as described with reference to the previous FIGS. 1-9 to implement grid-based enrollment for face authentication.

The computing system 1000 includes communication devices 1002 that enable wired and/or wireless communication of device data 1004 (e.g., radar data, authentication data, reference data, received data, data that is being received, data scheduled for broadcast, and data packets of the data). The device data 1004 or other device content can include configuration settings of the device, media content stored on the device, and/or information associated with a user of the device (e.g., an identity of a person within a radar field or customized air gesture data). Media content stored on the computing system 1000 can include any type of radar, biometric, audio, video, and/or image data. The computing system 1000 includes one or more data inputs 1006 via which any type of data, media content, and/or inputs can be received, such as human utterances, interactions with a radar field, touch inputs, user-selectable inputs or interactions (explicit or implicit), messages, music, television media content, recorded video content, and any other type of audio, video, and/or image data received from any content and/or data source.

The computing system 1000 also includes communication interfaces 1008, which can be implemented as any one or more of a serial and/or a parallel interface, a wireless interface, any type of network interface, a modem, and as any other type of communication interface. The communication interfaces 1008 provide a connection and/or communication links between the computing system 1000 and a communication network by which other electronic, computing, and communication devices communicate data with the computing system 1000.

The computing system 1000 includes one or more processors 1010 (e.g., any of microprocessors, controllers, or other controllers) that can process various computer-executable instructions to control the operation of the computing system 1000 and to enable techniques for, or in which can be implemented, grid-based enrollment for face authentication. Alternatively or additionally, the computing system 1000 can be implemented with any one or combination of hardware, firmware, or fixed logic circuitry that is implemented in connection with processing and control circuits, which are generally identified at 1012. Although not shown, the computing system 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1000 also includes computer-readable media 1014, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 1000 can also include a mass storage media device (storage media) 1016.

The computer-readable media 1014 provides data storage mechanisms to store the device data 1004, as well as various device applications 1018 and any other types of information and/or data related to operational aspects of the computing system 1000. For example, an operating system 1020 can be maintained as a computer application with the computer-readable media 1014 and executed on the processors 1010. The device applications 1018 may include a device manager, such as any form of a control application, software application, signal-processing and control modules, code that is native to a particular device, an abstraction module, an air gesture recognition module, and other modules. The device applications 1018 may also include system components, engines, modules, or managers to implement grid-based enrollment for face authentication, such as the enrollment module 118 and the camera driver system 216. The computing system 1000 may also include, or have access to, one or more machine-learning systems.

Some examples are described below:

Example 1. A method for a grid-based enrollment for face authentication by a user device, the method comprising: responsive to a user input, presenting a preview image, captured by a camera, via a display device, the presenting to initiate enrollment for face authentication; overlaying a two-dimensional (2D) object over the preview image, the 2D object having a region indicating an approximate orientation for a user to position their face relative to the camera; responsive to a determination that the user's face is positioned at the approximate orientation, removing the 2D object and presenting a three-dimensional (3D) tracking window as an overlay over the preview image, the 3D tracking window having a plurality of segments; tracking an approximate direction that the user's face is facing relative to the camera; based on the tracking: highlighting one or more segments of the plurality of segments of the 3D tracking window that correspond to the approximate direction that the user's face is facing; capturing one or more enrollment images of the user's face facing the approximate direction; generating one or more embeddings based on the one or more enrollment images; storing, in a secure storage unit, the one or more embeddings in a fixed grid of pose cells corresponding to various facial poses for use in face authentication; and responsive to generation and storage of the one or more embeddings, providing an indication that the one or more segments are complete.

Example 2. The method of example 1, wherein the providing of the indication that the one or more segments are complete comprises changing an opacity of the one or more segments to indicate progress.

Example 3. The method of example 1 or 2, further comprising, responsive to completing the enrollment: presenting a confirmation of completion of the enrollment; and enabling the one or more embeddings stored in the secure storage unit to be used to unlock the user device via the face authentication.

Example 4. The method of any preceding example, wherein the 3D tracking window is shaped to direct the user to roll or rotate their head.

Example 5. The method of any preceding example, wherein the 3D tracking window comprises a hemisphere.

Example 6. The method of any preceding example, wherein the preview image is a live preview.

Example 7. The method of any preceding example, further comprising: responsive to presenting the 3D tracking window, initiating a timer; resetting the timer upon completion of a respective segment of the plurality of segments; and responsive to the timer expiring without one or more new segments of the plurality of segments being completed, providing an indication to direct the user to face a new direction corresponding to at least one of the one or more new segments.

Example 8. The method of any preceding example, further comprising: determining that a first segment, of the plurality of segments, near an edge of the 3D tracking window is incomplete and multiple segments adjacent to the first segment are complete; and indicating to the user that the first segment is complete without capturing an enrollment image of the user's face facing a direction corresponding to the first segment.

Example 9. The method of any preceding example, wherein the plurality of segments each correspond to a pose of the user's head.

Example 10. The method of any preceding example, wherein the pose cells in the grid of pose cells are characterized by pan angle and tilt angle.

Example 11. The method of any preceding example, wherein: the highlighting of the one or more segments comprises: fading in a first segment corresponding to the approximate direction that the user's face is facing relative to the camera; and fading out the first segment when the approximate direction that the user's face is facing changes and no longer corresponds to the first segment; and a first animation speed corresponding to the fading in is greater than a second animation speed corresponding to the fading out.

Example 12. The method of any preceding example, wherein the indication that the one or more segments are complete comprises haptic feedback.

Example 13. The method of any preceding example, wherein the indication that the one or more segments are complete comprises audible feedback.

Example 14. The method of any preceding example, wherein: the camera comprises one or more color cameras and one or more near-infrared cameras; the one or more color cameras are used to capture the preview image; and the capturing of the one or more enrollment images of the user's face comprises capturing, using the one or more near-infrared cameras, one or more near-infrared images usable to generate the one or more embedding s.

Example 15. A user device comprising: a camera for capturing a preview image; a display device for displaying the preview image; and a processor and memory for implementing the method of any preceding example.

Example 16. A user device comprising: a camera system configured to capture images of a face of a user for face authentication; a display device configured to display a preview image including the user's face; and a processor and memory to implement an enrollment module configured to: responsive to initiation of an enrollment process, cause a two-dimensional (2D) object to be overlaid over the preview image, the 2D object comprising a center region indicating an approximate orientation for the user to position their face relative to the camera system; responsive to a determination that the user's face is positioned within the center region, present a three-dimensional (3D) tracking window as an overlay over the preview image, the 3D tracking window having a plurality of segments, the plurality of segments persisting to correspond to an approximate direction that the user's face is facing relative to the camera system; track the approximate direction that the user's face is facing; determine one or more segments of the plurality of segments that correspond to the approximate direction that the user's face is facing; highlight the one or more segments to provide visual feedback to the user; cause the camera system to capture one or more enrollment images corresponding to a pose of the user's face facing the approximate direction; generate one or more embeddings corresponding to the one or more enrollment images; and responsive to an indication that the one or more embeddings have been generated, provide an indication that the one or more segments are complete.

Example 17. The user device of example 16, wherein the 3D tracking window is shaped as a hemisphere and is overlaid over the preview image such that the user's face in the preview image is displayed within the hemisphere.

Example 18. The user device of example 16 or 17, wherein the enrollment module is further configured to: responsive to presentation of the 3D tracking window, initiate a timer; reset the timer upon completion of a respective segment of the plurality of segments; and responsive to the timer expiring without one or more new segments of the plurality of segments being completed, provide an indication to direct the user to face a direction of at least one of the one or more new segments.

Example 19. The user device of any one of examples 16 to 18, wherein the plurality of segments each correspond to a pose of the user's head.

Example 20. The user device of any one of examples 16 to 19, wherein the indication that the one or more segments are complete comprises a change in opacity of the one or more segments.

Example 21. A computer-readable storage media comprising instructions that, when executed, configure at least one processor of a user device to: display a preview image, captured by a camera system of the user device, via a display device during an enrollment process for face authentication; cause a two-dimensional (2D) object to be overlaid over the preview image, the 2D object comprising a center region indicating an approximate orientation for a user to position their face relative to the camera system; responsive to a determination that the user's face is positioned within the center region, present a three-dimensional (3D) tracking window as an overlay over the preview image, the 3D tracking window having a plurality of segments, the plurality of segments persisting to correspond to an approximate direction that the user's face is facing relative to the camera system; track the approximate direction that the user's face is facing; identify one or more segments of the plurality of segments that correspond to the approximate direction that the user's face is facing; highlight the one or more segments to provide visual feedback to the user; cause the camera system to capture one or more enrollment images corresponding to a pose of the user's face facing the approximate direction; generate embeddings corresponding to the one or more enrollment images; and responsive to an indication that embeddings have been generated for the pose, provide an indication that the one or more segments are complete.

Example 22. The computer-readable storage medium of example 21, wherein: the embeddings include a pair of 2D and 3D embeddings for a pose of the user's face facing the approximate direction; and the at least one processor is configured to store the embeddings in a fixed grid of pose cells, which are characterized by pan angle and tilt angle.

CONCLUSION

Although implementations of techniques for, and apparatuses enabling grid-based enrollment for face authentication have been described in language specific to features and/or methods, it is to be understood that the subject of the appended claims is not necessarily limited to the specific features or methods described. Rather, the specific features and methods are disclosed as example implementations of grid-based enrollment for face authentication.

What is claimed is:

1. A method for a grid-based enrollment for face authentication by a user device, the method comprising:
responsive to a user input, presenting a preview image, captured by a camera, via a display device, the presenting to initiate enrollment for face authentication;
overlaying a two-dimensional (2D) object over the preview image, the 2D object having a region indicating an approximate orientation for a user to position their face relative to the camera;
responsive to a determination that the user's face is positioned at the approximate orientation, removing the 2D object and presenting a three-dimensional (3D) tracking window as an overlay over the preview image, the 3D tracking window having a plurality of segments;
tracking an approximate direction that the user's face is facing relative to the camera;
based on the tracking:
highlighting one or more segments of the plurality of segments of the 3D tracking window that correspond to the approximate direction that the user's face is facing;
capturing one or more enrollment images of the user's face facing the approximate direction;
generating one or more embeddings based on the one or more enrollment images;
storing, in a secure storage unit, the one or more embeddings in a fixed grid of pose cells corresponding to various facial poses for use in face authentication; and
responsive to generation and storage of the one or more embeddings, providing an indication that the one or more segments are complete.

2. The method of claim 1, wherein the providing of the indication that the one or more segments are complete comprises changing an opacity of the one or more segments to indicate progress.

3. The method of claim 1, further comprising, responsive to completing the enrollment:
presenting a confirmation of completion of the enrollment; and
enabling the one or more embeddings stored in the secure storage unit to be used to unlock the user device via the face authentication.

4. The method of claim 1, wherein the 3D tracking window is shaped to direct the user to roll or rotate their head.

5. The method of claim 1, wherein the 3D tracking window comprises a hemisphere.

6. The method of any preceding claim 1, wherein the preview image is a live preview.

7. The method of claim 1, further comprising:
responsive to presenting the 3D tracking window, initiating a timer;
resetting the timer upon completion of a respective segment of the plurality of segments; and
responsive to the timer expiring without one or more new segments of the plurality of segments being completed, providing an indication to direct the user to face a new direction corresponding to at least one of the one or more new segments.

8. The method of claim 1, further comprising:
determining that a first segment, of the plurality of segments, near an edge of the 3D tracking window is incomplete and multiple segments adjacent to the first segment are complete; and
indicating to the user that the first segment is complete without capturing an enrollment image of the user's face facing a direction corresponding to the first segment.

9. The method of claim 1, wherein the plurality of segments each correspond to a pose of their head.

10. The method of claim 1, wherein the pose cells in the grid of pose cells are characterized by pan angle and tilt angle.

11. The method of claim 1, wherein:
the highlighting of the one or more segments comprises:
fading in a first segment corresponding to the approximate direction that the user's face is facing relative to the camera; and
fading out the first segment when the approximate direction that the user's face is facing changes and no longer corresponds to the first segment; and
a first animation speed corresponding to the fading in is greater than a second animation speed corresponding to the fading out.

12. The method of claim 1, wherein the indication that the one or more segments are complete comprises haptic feedback.

13. The method of claim 1, wherein the indication that the one or more segments are complete comprises audible feedback.

14. The method of claim 1, wherein:
the camera comprises one or more color cameras and one or more near-infrared cameras;
the one or more color cameras are used to capture the preview image; and
the capturing of the one or more enrollment images of the user's face comprises capturing, using the one or more near-infrared cameras, one or more near-infrared images usable to generate the one or more embeddings.

15. A user device comprising:
a camera system configured to capture images of a face of a user for face authentication;
a display device configured to display a for displaying the preview image including the user's face; and
a processor and memory configured to implement an enrollment module configured to:
responsive to initiation of an enrollment process, cause a two-dimensional (2D) object to be overlaid over the preview image, the 2D object comprising a center region indicating an approximate orientation for the user to position their face relative to the camera system;
responsive to a determination that the user's face is positioned within the center region, present a three-dimensional (3D) tracking window as an overlay over the preview image, the 3D tracking window having a plurality of segments, the plurality of segments persisting to correspond to an approximate direction that the user's face is facing relative to the camera system;
track the approximate direction that the user's face is facing;
determine one or more segments of the plurality of segments that correspond to the approximate direction that the user's face is facing;
highlight the one or more segments to provide visual feedback to the user;
cause the camera system to capture one or more enrollment images corresponding to a pose of the user's face facing the approximate direction;
generate one or more embeddings corresponding to the one or more enrollment images; and
responsive to an indication that the one or more embeddings have been generated, provide an indication that the one or more segments are complete.

16. The user device of claim 15, wherein the 3D tracking window is shaped as a hemisphere and is overlaid over the preview image such that the user's face in the preview image is displayed within the hemisphere.

17. The user device of claim 15, wherein the enrollment module is further configured to:
responsive to presentation of the 3D tracking window, initiate a timer;
reset the timer upon completion of a respective segment of the plurality of segments; and
responsive to the timer expiring without one or more new segments of the plurality of segments being completed, provide an indication to direct the user to face a direction of at least one of the one or more new segments.

18. The user device of claim 15, wherein the plurality of segments each correspond to a pose of the user's head.

19. A computer-readable storage media comprising instructions that, when executed, configure at least one processor of a user device to:
display a preview image, captured by a camera system of the user device, via a display device during an enrollment process for face authentication;
cause a two-dimensional (2D) object to be overlaid over the preview image, the 2D object comprising a center region indicating an approximate orientation for a user to position their face relative to the camera system;
responsive to a determination that the user's face is positioned within the center region, present a three-dimensional (3D) tracking window as an overlay over the preview image, the 3D tracking window having a plurality of segments, the plurality of segments persisting to correspond to an approximate direction that the user's face is facing relative to the camera system;
track the approximate direction that the user's face is facing;
identify one or more segments of the plurality of segments that correspond to the approximate direction that the user's face is facing;
highlight the one or more segments to provide visual feedback to the user;
cause the camera system to capture one or more enrollment images corresponding to a pose of the user's face facing the approximate direction;
generate embeddings corresponding to the one or more enrollment images; and
responsive to an indication that embeddings have been generated for the pose, provide an indication that the one or more segments are complete.

20. The computer-readable storage media of claim 19, wherein:
the embeddings include a pair of 2D and 3D embeddings for a pose of the user's face facing the approximate direction; and
the at least one processor is configured to store the embeddings in a fixed grid of pose cells, which are characterized by pan angle and tilt angle.

* * * * *

UNITED STATES PATENT AND TRADEMARK OFFICE
CERTIFICATE OF CORRECTION

Page 1 of 1

PATENT NO. : 12,217,536 B2
APPLICATION NO. : 17/766688
DATED : February 4, 2025
INVENTOR(S) : Kevin Chyn, James Brooks Miller and Tyler Reed Kugler It is certified that error appears in the above-identified patent and that said Letters Patent is hereby corrected as shown below:

In the Claims

Column 24, Line 45, after "method of" before "claim 1", delete "any preceding"
Column 25, Lines 33-34, after "display a" before "preview", delete "for displaying the"

Signed and Sealed this
Fourth Day of March, 2025

Coke Morgan Stewart
*Acting Director of the United States Patent and Trademark Office*